US008880229B2

(12) United States Patent
Lee (10) Patent No.: US 8,880,229 B2
(45) Date of Patent: Nov. 4, 2014

(54) GRID-INTERACTIVE PHOTOVOLTAIC GENERATION SYSTEM WITH POWER QUALITY CONTROL AND ENERGY SAVING

(75) Inventor: Seong Ryong Lee, Jeonju-si (KR)

(73) Assignee: Kunsan National University Industry-Academy Cooperation Foundation, Gunsan-Si (KR)

( * ) Notice: Subject to any disclaimer, the term of this patent is extended or adjusted under 35 U.S.C. 154(b) by 881 days.

(21) Appl. No.: 12/991,595

(22) PCT Filed: Jun. 11, 2008

(86) PCT No.: PCT/KR2008/003263
§ 371 (c)(1),
(2), (4) Date: Nov. 8, 2010

(87) PCT Pub. No.: WO2009/145380
PCT Pub. Date: Dec. 3, 2009

(65) Prior Publication Data
US 2011/0088748 A1  Apr. 21, 2011

(30) Foreign Application Priority Data

May 30, 2008 (KR) .................. 10-2008-0050783

(51) Int. Cl.
*H02M 1/00* (2006.01)
*H02M 5/293* (2006.01)
*H02J 3/38* (2006.01)
*H02J 3/18* (2006.01)

(52) U.S. Cl.
CPC ............ *H02J 3/383* (2013.01); *Y02E 10/563* (2013.01); *H02M 5/293* (2013.01); *Y02E 10/58* (2013.01); *H02M 2001/0093* (2013.01); *Y02E 40/22* (2013.01); *H02J 3/1814* (2013.01); *Y02E 40/18* (2013.01); *H02J 3/1842* (2013.01); *Y10S 323/906* (2013.01)

USPC ........... 700/295; 700/291; 700/286; 323/906; 363/71; 363/95; 363/65; 136/244

(58) Field of Classification Search
None
See application file for complete search history.

(56) References Cited

U.S. PATENT DOCUMENTS 3,932,799 A    1/1976  Frank et al.
6,281,485 B1 *  8/2001  Siri ........................... 250/203.4
(Continued)

FOREIGN PATENT DOCUMENTS

AU    WO 03/084041 A1    10/2003

OTHER PUBLICATIONS

Abo-Khalil, A.G.; Lee, D.-C.; Choi, J.-W.; and Kim, H.-G., "Maximum Power Point Tracking Controller Connecting PV System to Grid", Jul. 2006, Journal of Power Electronics, vol. 6, No. 3.*

(Continued)

*Primary Examiner* — Mohammad Ali
*Assistant Examiner* — Kelvin Booker
(74) *Attorney, Agent, or Firm* — Novick, Kim & Lee, PLLC; Jae Youn Kim (57) ABSTRACT

Disclosed here is a grid-interactive photovoltaic generation system having power quality improvement and power saving functions. The grid-interactive photovoltaic generation system includes a solar cell array, a first inverter, and a second inverter. The solar cell array receives solar light and generates predetermined power. The first inverter converts the power, generated by the solar cell array, into power required by a grid line. The second inverter is connected to the first inverter, and steps down power, which will be supplied to a load, to an appropriate voltage.

5 Claims, 10 Drawing Sheets

(56) References Cited

U.S. PATENT DOCUMENTS

| | | | |
|---|---|---|---|
| 6,297,616 B1 | 10/2001 | Kubo et al. | |
| 6,433,522 B1* | 8/2002 | Siri | 323/272 |
| 7,072,194 B2* | 7/2006 | Nayar et al. | 363/71 |
| 7,126,053 B2* | 10/2006 | Kurokami et al. | 136/252 |
| 7,158,395 B2* | 1/2007 | Deng et al. | 363/95 |
| 7,188,474 B2 | 3/2007 | van de Loo | |
| 7,193,872 B2* | 3/2007 | Siri | 363/95 |
| 7,248,946 B2* | 7/2007 | Bashaw et al. | 700/286 |
| 7,269,036 B2* | 9/2007 | Deng et al. | 363/49 |
| 7,324,361 B2* | 1/2008 | Siri | 363/95 |
| 7,463,500 B2* | 12/2008 | West | 363/132 |
| 7,638,983 B2* | 12/2009 | Park et al. | 322/20 |
| 7,834,485 B2* | 11/2010 | Park | 307/117 |
| 7,834,580 B2* | 11/2010 | Haines | 320/101 |
| 7,952,897 B2* | 5/2011 | Nocentini et al. | 363/41 |
| 8,089,785 B2* | 1/2012 | Rodriguez | 363/35 |
| 8,102,144 B2* | 1/2012 | Capp et al. | 320/101 |
| 8,139,382 B2* | 3/2012 | Zhang et al. | 363/41 |
| 8,158,877 B2* | 4/2012 | Klein et al. | 136/244 |
| 8,189,352 B2* | 5/2012 | Egiziano et al. | 363/35 |
| 8,203,069 B2* | 6/2012 | Gilmore et al. | 136/244 |
| 8,325,499 B2* | 12/2012 | Krein et al. | 363/39 |
| 8,350,411 B2* | 1/2013 | Kimball et al. | 307/64 |
| 8,405,367 B2* | 3/2013 | Chisenga et al. | 323/207 |
| 8,406,022 B2* | 3/2013 | Kim et al. | 363/95 |
| 8,462,518 B2* | 6/2013 | Marroquin et al. | 361/807 |
| 8,482,153 B2* | 7/2013 | Ledenev et al. | 307/64 |
| 2004/0207366 A1* | 10/2004 | Sung | 320/140 |
| 2005/0007797 A1* | 1/2005 | Zocchi et al. | 363/65 |
| 2005/0063115 A1 | 3/2005 | Nayar et al. | |
| 2005/0254191 A1* | 11/2005 | Bashaw et al. | 361/62 |
| 2007/0159866 A1* | 7/2007 | Siri | 363/95 |
| 2008/0236648 A1* | 10/2008 | Klein et al. | 136/244 |
| 2008/0278983 A1* | 11/2008 | Park | 363/95 |
| 2008/0303489 A1* | 12/2008 | Park et al. | 322/20 |
| 2009/0059631 A1* | 3/2009 | Krein | 363/95 |
| 2009/0069950 A1* | 3/2009 | Kurokami et al. | 700/291 |
| 2009/0078300 A1* | 3/2009 | Ang et al. | 136/244 |
| 2009/0091956 A1* | 4/2009 | Nocentini et al. | 363/65 |
| 2009/0141522 A1* | 6/2009 | Adest et al. | 363/55 |
| 2009/0147554 A1* | 6/2009 | Adest et al. | 363/71 |
| 2009/0279336 A1* | 11/2009 | Erdman et al. | 363/131 |
| 2010/0223180 A1* | 9/2010 | Kremen | 705/40 |
| 2010/0229915 A1* | 9/2010 | Ledenev et al. | 136/244 |
| 2010/0236622 A1* | 9/2010 | Khajehoddin et al. | 136/252 |
| 2010/0265747 A1* | 10/2010 | Egiziano et al. | 363/132 |
| 2010/0283325 A1* | 11/2010 | Marcianesi et al. | 307/82 |
| 2010/0286836 A1* | 11/2010 | Shaver et al. | 700/287 |
| 2010/0309695 A1* | 12/2010 | Fornage | 363/95 |
| 2011/0043160 A1* | 2/2011 | Serban | 320/101 |
| 2011/0067745 A1* | 3/2011 | Ledenev et al. | 136/244 |
| 2011/0084553 A1* | 4/2011 | Adest et al. | 307/63 |
| 2011/0164440 A1* | 7/2011 | Krein | 363/95 |
| 2011/0291486 A1* | 12/2011 | Adest et al. | 307/77 |
| 2012/0143383 A1* | 6/2012 | Cooperrider et al. | 700/295 |
| 2012/0205981 A1* | 8/2012 | Varma et al. | 307/64 |
| 2014/0078799 A1* | 3/2014 | Erdman et al. | 363/97 |

OTHER PUBLICATIONS

Dejia, Z.; Zhemgming, Z.; Eltawil, M.; and Liqiang, Y., "Design and Control of a Three-Phase Grid-Connected Photovoltaic System with Developed Maximum Power Point Tracking", 2008 IEEE.*

Ho, B.M.T. and Chung, H.S.-H., "An Integrated Inverter with Maximum Power Tracking for Grid-Connected PV Systems", Jul. 2005, IEEE Transactions on Power Electronics, vol. 20, No. 4.*

Khaehintung, N.; Sirisuk, P.; and Kunakorn, A., "Grid-Connected Photovoltaic System with Maximum Power Point Tracking Using Self-Organizing Fuzzy Logic Controller", Nov. 2005, TENCON 2005.*

Ko, S.-H.; Lee, S.-R.; Dehbonei, H.; and Nayar, C.V., "A Grid-Connected Photovoltaic System with Direct Coupled Power Quality Control", Nov. 2006, 32nd Annual Conference on IEEE Industrial Electronics, IECON 2006.*

Ko, S.-H.; Cho, A.-R.; Kang, D.-U.; Park, C.-S.; Jeon, C.-H. and Lee, S.-R., "A Grid-Interactive PV Generation System with the Function of the Power Quality Improvement", Aug. 2007, vol. 12., Iss. 4.*

Regen Power, "An AC Coupled PV/Wind/Diesel Microgrid System Implemented in a Remote Island in the Republic of Maldives", Jan. 2008.*

Sharifian, M.B.B.; Mohamadrezapour, Y.; Hosseinpour, M.; and Torabzade, S., "Single-Stage Grid Connected Photovoltaic System with Reactive Power Control and Adaptive Predictive Current Controller", 2009, Journal of Applied Sciences, vol. 9, Iss. 8.*

Subiyanto, Mohamed, A. and Hannan, M.A., "Maximum Power Point Tracking in Grid Connected PV Systems Using a Novel Fuzzy Logic Controller", Nov. 2009, Proceedings of the 2009 IEEE Student Conference on Research and Development (SCOReD 2009).*

Zhang, L.; Al-Amoudi, A.; and Bai, Y., "Real-Time Maximum Power Point Tracking for Grid-Connected Photovoltaic Systems", Sep. 2000, Power Electronics and Variable Speed Drives, Conference Publication No. 475.*

Hooman Dehbonei et al., 'A combined voltage controlled and current controlled "dual converter" for a weak grid connected photovoltaic system with battery energy storage', PESC 2002, 23-27, pp. 1495-1500, Jun. 2002.

Hooman Dehbonei et al., 'A multi-functional power processing unit for an off-grid pv diesel hybrid power system', PESC 2004, 20-25, pp. 1969-1975, Jun. 2004.

Sung-Hun KO et al., 'A grid-connected photovoltaic system with direct coupled power quality control', IECON 2006, 6-10, pp. 5203-5208, Nov. 2006.

International Search Report, Application No. PCT/KR2008/003263, dated Feb. 9, 2009.

* cited by examiner

GRID-INTERACTIVE PHOTOVOLTAIC GENERATION SYSTEM WITH POWER QUALITY CONTROL AND ENERGY SAVING

TECHNICAL FIELD

The present invention relates to a grid-interactive photovoltaic generation system, and, more particularly, to a high-quality multi-function grid-interactive photovoltaic generation system that is capable of producing maximum power using solar cells based on Maximum Power Point Tracking (MPPT), improving the power factor of a power source grid, reducing harmonics, and reducing the power consumed by an illumination load.

BACKGROUND ART

Recently, due to the rapid rise in international oil prices and the introduction of greenhouse gas reduction goals for solving the global warming problem, research into new & renewable energy capable of replacing fossil fuels has attracted attention throughout the world. In particular, Korea, which is dependent on imports for more than 97% of its energy, has set a goal of supplying 5% of its total energy using new & renewable energy sources in order to fundamentally improve the structure of the energy industry. With regard to photovoltaic generation systems, a project to build one hundred thousand solar homes, a general popularization project and a local popularization project are rapidly being conducted under the guidance of national and local governments.

In particular, a grid-interactive photovoltaic generation system attracts attention. In general, a grid-interactive photovoltaic generation system refers to a photovoltaic generation system that interacts with a grid power source. In detail, a grid-interactive photovoltaic generation system is a system that receives power from a grid power source when power produced through photovoltaic generation is smaller than power consumed by a load, and supplies surplus power to the grid power source when power produced through photovoltaic generation exceeds power consumed by a load, thereby improving overall operational efficiency.

*4In general, a grid-interactive photovoltaic generation system includes solar cells, an MPPT converter, and an inverter for supplying power, produced by the solar cells, to a grid.

Such a conventional grid-interactive photovoltaic generation system has a problem in that the rate of utilization thereof is very low compared to the high installation costs thereof because it can be used only in the daytime, during which solar radiation exists, due to the use of a method of simply supplying power, generated using solar light, to a grid under the MPPT control of a converter (inverter). Furthermore, there is another problem in that the power factor of a grid is degraded due to the supply of active power through photovoltaic generation when the conventional grid-interactive photovoltaic generation system is applied to a nonlinear and power factor load, such as a house or an office building. Furthermore, the conventional grid-interactive photovoltaic generation system has a problem in that the extent of utilization, such as operation in conjunction with other systems, is low, compared to the high installation costs thereof.

DISCLOSURE

Technical Problem

Accordingly, the present invention has been made keeping in mind the above problems occurring in the prior art, and an object of the present invention is to provide a grid-interactive photovoltaic generation system that is capable of producing maximum power in photovoltaic generation, improving the quality of grid power, such as the improvement of a power factor and a reduction in harmonics, and reducing the power consumption of an illumination load in conjunction with an illumination system.

Technical Solution

In order to accomplish the above object, the present invention provides a grid-interactive photovoltaic generation system including a solar cell array for receiving solar light and generating predetermined power; a first inverter for converting the power, generated by the solar cell array, into power required by a grid line; and a second inverter connected to the first inverter, and configured to step down power, which will be supplied to a load, to an appropriate voltage. Here, it is preferred that the first inverter be a Current Controlled Voltage Source Inverter (CCVSI) connected to a grid input power source, and the second inverter be a Voltage Controlled Voltage Source Inverter (VCVSI) connected in parallel between a power source and a load.

Furthermore, it is preferred that the grid-interactive photovoltaic generation system according to the present invention further include a Maximum Power Point Tracking (MPPT)-Power Quality Control (PQC) integrated controller for controlling the operation of the first inverter in order to maximize power from the solar cell array and output high-quality power and a voltage controller for controlling the operation of the second inverter in order to realize illumination power saving. Furthermore, it is preferable to further include a controller for performing control depending on whether there is solar light.

Here, the controller controls an MPPT-PQC integrated controller in a nighttime mode for performing Power Quality Control (PQC) in order to output high-quality power to the grid during the nighttime, during which there is no solar light, and in a daytime mode for simultaneously performing both PQC and MPPT during the daytime, during which there is solar light.

Furthermore, it is preferred that the grid-interactive photovoltaic generation system according to the present invention further include a capacitor for stabilizing voltage that is connected between the first inverter and the second inverter and disposed between the solar cell array and a DC side between the first inverter and the second inverter.

Advantageous Effects

A grid-interactive photovoltaic generation system according to the present invention includes a second inverter that is connected to a first inverter for converting power, generated by a solar cell array, into power required by a grid line and stably supplies a voltage, lower than a supplied voltage by 10%, to an illumination load, with the result that there is an advantage in that the power consumed by the illumination load can be reduced by about 20%.

Furthermore, the grid-interactive photovoltaic generation system according to the present invention is configured such that the inverter performs Power Quality Control (PQC) during the nighttime and simultaneously performs both PQC and MPPT during the daytime, and thus the maximum power of photovoltaic generation can be produced, and the realization of high-quality grid power, such as the improvement of a power factor, which is inevitably degraded at the time of photovoltaic generation, and a reduction in harmonics attributable to a nonlinear load, can be achieved, with the result that there is an advantage in that IEEE std-1159 and the distribution grid-interactive technology standard of Korea Electric Power Corporation are met.

BEST MODE

Preferred embodiments of a grid-interactive photovoltaic generation system according to the present invention will be described in detail below with reference to FIGS. 1 to 10.

The scope of the rights of the present invention is not limited to the following embodiments, but it will be apparent to those skilled in the art that the present invention may be modified and practiced in various ways within a range that does not depart from the technical spirit of the present invention. Furthermore, terms and words used in the present specification and the claims should not be interpreted as having typical and dictionary meanings, but must be interpreted as having meanings and concepts suitable for the technical spirit of the present invention based on the principle that an inventor can appropriately define the concepts of terms in order to describe his or her invention in the best way.

Figure 1:
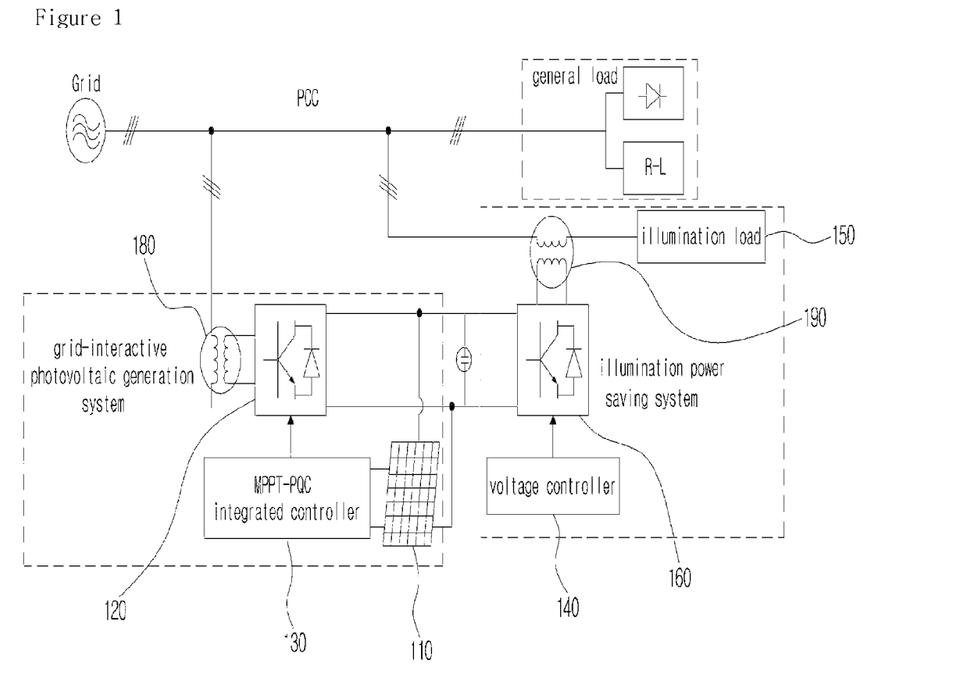
FIG. 1 is a diagram showing the construction of an embodiment of a grid-interactive photovoltaic generation system according to the present invention.

FIG. 1 is a diagram showing the construction of an embodiment of a grid-interactive photovoltaic generation system according to the present invention. Here, in the embodiment of the present invention, a load connected to a grid is an illumination load.

As shown in FIG. 1, the embodiment of the grid-interactive photovoltaic generation system according to the present invention includes a solar cell array 110 composed of solar cells for each receiving solar light and a predetermined voltage; a first inverter 120 for converting a voltage, generated in the solar cell array 110, into a voltage required by a grid line; an MPPT-PQC integrated controller 130 for performing MPPT in order to maximize power, generated in the solar cell array 110, by controlling the operation of the first inverter 120 and, simultaneously, performing power quality control so that the power factor of a grid and harmonics can meet IEEE std-1159 and the distribution grid-interactive technology standard of Korea Electric Power Corporation, depending on the load; a second inverter 160 connected to the first inverter 120 and configured to step down a supplied voltage to a voltage suitable for an illumination load 150 in order to obtain a power saving effect; a first transformer 180 for converting the voltage, obtained through the conversion by the first inverter 120, into the level of a commercial voltage required by a grid, and a second transformer 190 for converting the voltage, output from the second inverter 160, into the level of a voltage required by the illumination load 150; a voltage controller 140 for controlling the second inverter 160; a controller (not shown) for controlling the voltage controller 140 depending on whether there is solar light in order to achieve illumination power saving; and a capacitor 170 for stabilizing voltage connected between the first inverter and the second inverter and disposed between the solar cell array 110 and a DC side between the first inverter 120 and the second inverter 160.

Here, it is preferred that the first inverter be a Current Controlled Voltage Source Inverter (CCVSI) connected in parallel to a grid input power source. The first inverter converts a voltage generated by the solar cell array 110 into a voltage required by a grid line, for example, a parallel voltage. It is preferred that the second inverter be a Voltage Controlled Voltage Source Inverter (VCVSI), which is connected in series between a power source and a load. The second inverter steps down a voltage, which will be supplied to the illumination load 150, to an appropriate voltage in order to achieve a power saving effect related to power consumed by the illumination load 150.

The MPPT-PQC integrated controller 130 includes an MPPT control unit for performing MPPT in order to maximize power, generated in the solar cell array 110, through the control of the operation of the first inverter 120, and a PQC unit for performing power quality control so that the power factor of a grid and harmonics meet IEEE std-1159 and the distribution grid-interactive technology standard of Korea Electric Power Corporation, depending on the load.

The MPPT-PQC integrated controller 130 operates in a nighttime mode and a daytime mode. The MPPT-PQC integrated controller 130 controls the operation of the first inverter 120 in a nighttime mode, in which Power Quality Control (PQC) is performed to output high-quality power to the grid, in the nighttime, during which there is no solar light, and controls the operation of the first inverter 120 in a daytime mode, in which both PQC and MPPT are simultaneously performed, in the daytime, during which there is solar light.

The voltage controller 140 controls the operation of the second inverter 160. The voltage controller 140 controls the operation of the second inverter 160 so that a voltage, which will be supplied to the illumination load 150, is stepped down to an appropriate voltage regardless of the presence of solar light in order to save illumination power.

The operation of the grid-interactive photovoltaic generation system according to the present invention will be described in detail below with reference to FIGS. 2 to 10.

The solar cell array 110 is a collection of solar cells for receiving solar light and generating DC power, generates predetermined power, that is, DC power, using solar cells, and transmits the generated DC power to the first inverter 120. The first inverter 120 converts the DC power, transmitted from the solar cell array 110, into power required by the grid line, that is, AC power.

Furthermore, the first transformer 180 converts the AC power into a commercial voltage having a level required by the grid, for example, 220 V. Here, the MPPT-PQC integrated controller 130 includes an MPPT control unit for maximizing the power generated by the solar cell array 110, and a PQC unit for ensuring that the power factor of the grid and harmonics meet IEEE std-1159 and the distribution system interconnection technology standard of Korea Electric Power Corporation. This will be described in detail below with reference to FIG. 2.

Figure 2:
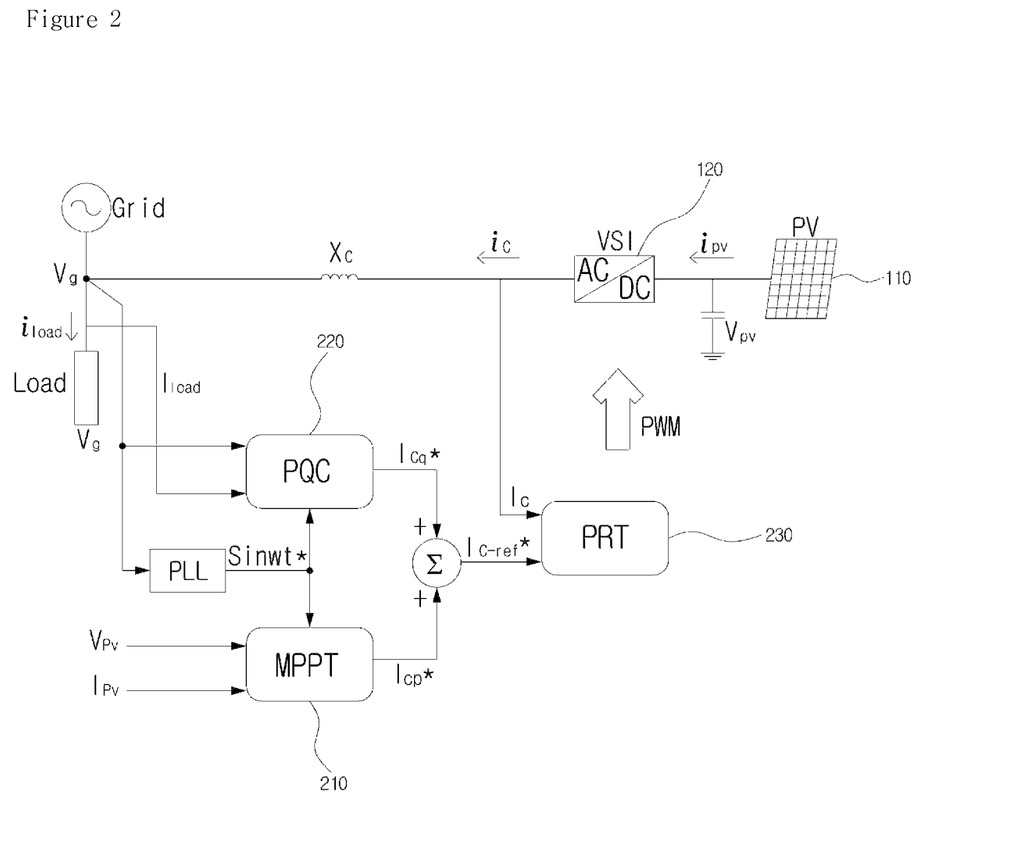
FIG. 2 is a controller block diagram illustrating the operational principle of the MPPT-PQC integrated controller 130 of FIG. 1 according to the present invention.

FIG. 2 is a controller block diagram illustrating the operational principle of the MPPT-PQC integrated controller 130 of FIG. 1 according to the present invention.

Here, the grid-interactive photovoltaic generation system according to the present invention must supply both maximum generation power (active power) based on solar light and reactive power generated in the load or grid. Accordingly, an active current command value $I^*_{cp}$ for supplying active power to the grid and a reactive current command value $I^*_{cq}$ for compensating for a reactive current component are required. The system according to the present invention can control $I^*_{cp}$ and $I^*_{cq}$ independently. In order to implement this, the present invention enables the implementation of an MPPT-PQC integrated controller merely by changing the program of a control processor without adding a new circuit to an existing grid-interactive solar light system. Accordingly, the improvement of power quality can be additionally achieved along with MPPT control without significant influence on the cost of the system.

First, the MPPT control unit 210 controls the active current command value $I^*_{cp}$ of the first inverter 120 in order to realize maximum power point tracking based on the output voltage $V_{pv}$ and current $I_{pv}$ of the solar cell array 110. Since this method is a well-known technique and does not constitute the gist of the present invention, a detailed description thereof is omitted here.

Furthermore, the PQC unit 220 performs control differently depending on whether an active current command value $I^*_{cp}$ is applied by the MPPT control unit 210, which will be described in detail below. When the first inverter 120 of FIG. 1 or 2 is operated as a current controlled voltage source inverter capable of directly controlling output current, the output of the first inverter 120 may be considered to be equivalent AC current output. Accordingly, grid voltage Vg, first inverter voltage Vc and load voltage $V_{load}$ are connected in parallel and have the same level and phase, and load current $I_{load}$ is supplied based on grid current $I_g$ and first inverter current $I_c$ and is expressed by the following Equation 1.

$$I_{load}=I_g+I_c \qquad \text{[Math Figure 1]}$$

The grid-interactive photovoltaic generation system according to the present invention may be operated in a nighttime mode and in a daytime mode. Since, in a nighttime mode, there is no output from the solar cell array 110, there is no active current command value $I^*_{cp}$ from the MPPT control unit 210, and thus the overall load active power $P_{load}$ must be supplied by the grid. In this case, when the load includes a reactance component or is nonlinear, control must be performed such that the first inverter 120 is responsible for reactive power based on the reactive current command value $I^*_{cq}$ from the PQC unit 220, and the grid can always supply only active power, in order to realize unit power factor control and a reduction in harmonics. Accordingly, the required grid current $I^*_g$ is obtained using the following Equation 2.

$$I^*_g = \text{Re}[I_{load}] = \frac{P_{load}}{V_g} \qquad \text{[Math Figure 2]}$$

Meanwhile, in a daytime mode, the first inverter 120 supplies active power to the grid or load using photovoltaic generation through the control of the active current command value $I^*_{cp}$ from the MPPT control unit 210, in which case the current of the grid must always include only an active power component in order to perform unit power factor control. Accordingly, the grid current $I^*_g$ required in the daytime mode is obtained using the following Equation 3

$$I^*_g = \text{Re}[I_{load}] - \text{Re}[I_c] = \frac{P_{load} - P_{pv}}{V_g} \qquad \text{[Math Figure 3]}$$

As a result, the resulting inverter command current $I^*_c$ can be obtained using the difference between the load current $I_{load}$ and the grid current $I^*_g$, satisfying Equation 2 or 3 depending on the mode, which is expressed by the following Equation 4.

$$I^*_c = I_{load} - I^*_g \qquad \text{[Math Figure 4]}$$

As a result, in the grid-interactive photovoltaic generation system according to the present invention, in a nighttime mode, only the PQC unit 220 of FIG. 2 operates because there is no solar light output, which means that the improvement of power quality, such as the improvement of the power factor and a reduction in harmonics, is performed using Equations 2 and 4. Meanwhile, in a daytime mode, both the MPPT control unit 210 and PQC unit 220 of FIG. 2 simultaneously operate because maximum power point tracking control based on solar light must be considered, with the result that both the MPPT of photovoltaic generation and the improvement of the power quality of the grid are performed using Equations 3 and 4.

Furthermore, the grid-interactive photovoltaic generation system according to the present invention supplies a voltage appropriate for the maximization of an energy saving effect to the illumination load 150 regardless of an input grid voltage in conjunction with the illumination load.

For this purpose, the grid-interactive photovoltaic generation system according to the present invention includes a second inverter 160 connected to the first inverter 120; and the second transformer 190 configured such that the second inverter 160 adjusts a voltage for the illumination load 150 to a voltage (for example, 200 V) appropriate for the maximization of a power saving effect. Furthermore, it is preferred that the grid-interactive photovoltaic generation system according to the present invention further include a capacitor 170 for stabilizing voltage on a DC side between the solar cell array 110, the first inverter 120 and the second inverter 160.

Here, the operation of the voltage controller 140 for saving the power of the illumination load 150 according to the present invention will be described below.

The illumination power saving of the grid-interactive photovoltaic generation system according to the present invention is realized in such a way as to control voltage applied to the illumination load 150 by operating the second inverter 160 of FIG. 1 as a voltage controlled voltage source inverter capable of directly controlling output voltage, thereby adjusting the output of the second inverter 160 to equivalent AC voltage. That is, the voltage $V_L$ of the illumination load 150 is adjusted to a voltage appropriate for the saving of illumination power by controlling the voltage $V_x$ of the second transformer 190 connected in series between the input grid and the illumination load 150. Accordingly, the voltage command value $V^*_x$ of the second inverter 160 is calculated by the voltage controller 140 in order to set an optimum illumination voltage $V_L$ capable of maximizing power saving while maintaining appropriate illuminance and maintain and supply the voltage at a uniform level regardless of the level of the input grid voltage $V_g$. The relationship therebetween can be expressed as follows.

$$V^*_x = V_g - V_L \qquad \text{[Math Figure 5]}$$

The output voltage of the second inverter 160 controlled based on Equation 5 is output as a control voltage $V_x$ through the second transformer 190 connected to the second inverter 160. Accordingly, a load voltage $V_L$ appropriate for energy saving can be maintained by controlling $V_x$ regardless of the level of the applied grid voltage. For this purpose, the present invention controls the second inverter 160 using the voltage controller 140 as a voltage controlled voltage source inverter, unlike the existing power saving device. Since the second inverter 160 enables bidirectional control, it is possible to linearly control $V_x$ in a range from a positive (+) voltage to a negative (−) voltage, and thus it is possible to step up and down the illumination load voltage $V_L$. Furthermore, since the control range of $V_x$ falls within the range of utilization voltage corresponding to the range of the upper and lower 10% of rating, 10% of load rating is sufficient for the capacity of the inverter for the control and the energy thereof is regenerated on a power source side through the first inverter 120 connected in common.

In order to check whether the grid-interactive photovoltaic generation system according to the present invention can be operated in conformity with the intention of the invention, the results of PSIM simulation are shown in FIGS. 3 to 7.

Figure 3:
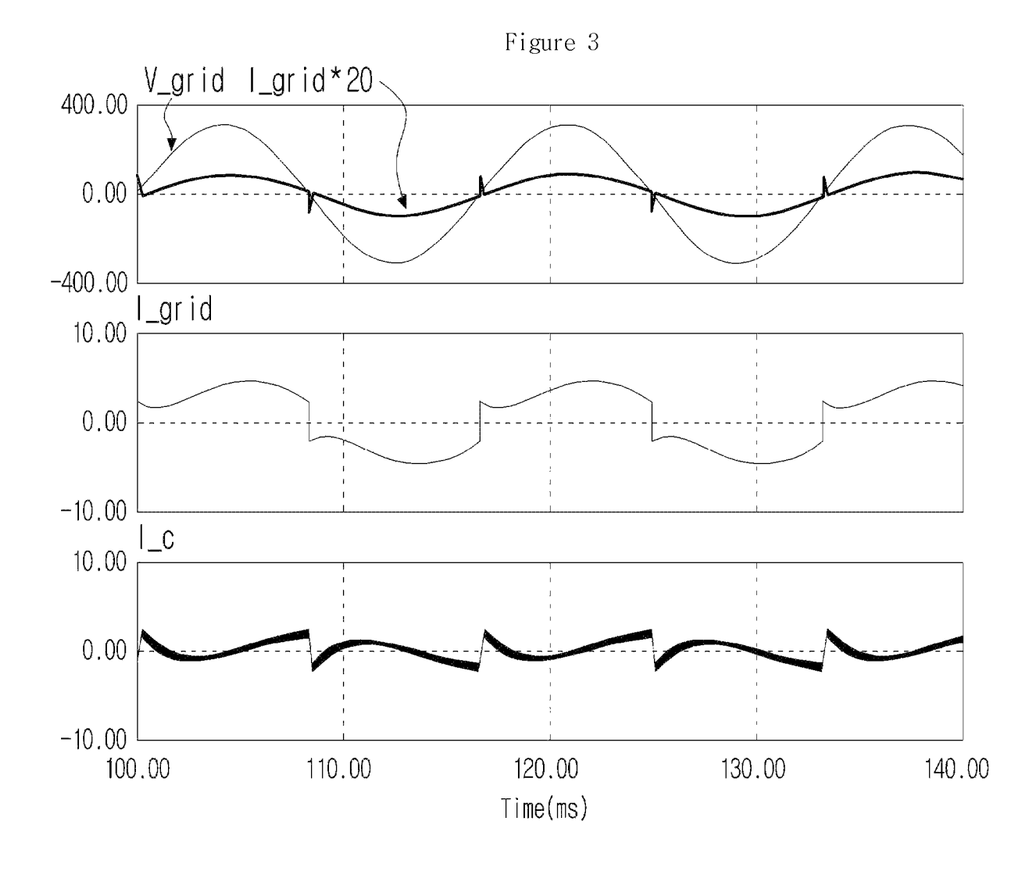
FIG. 3 shows the resultant waveforms of the simulation of the operation of the MPPT-PQC integrated controller in a nighttime mode in the grid-interactive photovoltaic generation system according to the present invention.

FIG. 3 shows the resultant waveforms of the simulation of the operation of the MPPT-PQC integrated controller 130 in a nighttime mode when 220 V, 60 Hz input voltage is applied to a nonlinear load having a capacity of 702 VA (611 W, 345 Var, PF 0.87) in the grid-interactive photovoltaic generation system according to the present invention.

The simulation was performed using PSIM software on the assumption that all devices used in the simulation were ideal. FIG. 3 sequentially shows the waveforms of the input grid voltage $V_{grid}$ and current $I_{grid}$ (magnified 20 times for ease of display), the waveform of the load current $I_{load}$ and the waveform of the first inverter output current Ic from the top thereof. From this, it can be seen that, in conformity with the intention of the present invention, in a nighttime mode, the MPPT-PQC integrated controller 130 performs compensation for reactive power and a harmonic component, required by the load, through control only on the PQC unit 220 of FIG. 2 because there is no output from the solar cells, and thus the grid supplies only an active power component at high quality, as shown in FIG. 3.

Figure 4:
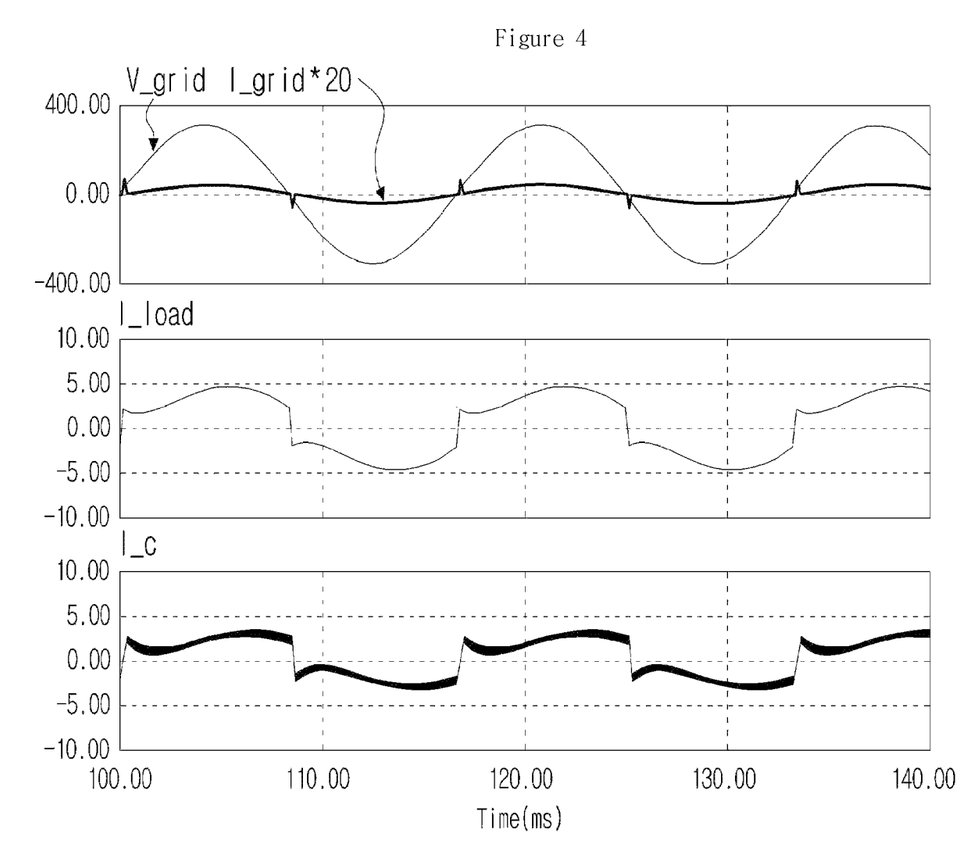
FIG. 4 shows the resultant waveforms of the simulation of the operation of the MPPT-PQC integrated controller in a daytime mode in the grid-interactive photovoltaic generation system according to the present invention.

FIG. 4 shows the resultant waveforms of the simulation of the operation of the MPPT-PQC integrated controller 130 that was conducted under experimental conditions, such as those shown in FIG. 3, in a daytime mode (the amount of solar radiation for solar cells: 500 W/m2, temperature: 25° C.) in the grid-interactive photovoltaic generation system according to the present invention. FIG. 4 sequentially shows the waveforms of the input grid voltage $V_{grid}$ and current $I_{grid}$ (magnified 20 times for ease of display), the waveform of the load current $I_{load}$ and the waveform of the first inverter output current Ic from the top thereof. Since MPPT based on solar light must be considered in a daytime mode in conformity with the intention of the present invention, the MPPT control unit 210 and PQC unit 220 of the MPPT-PQC integrated controller 130 of FIG. 2 operate at the same time, and, using an MPPT control algorithm, generates both an active power component command value capable of tracking a maximum output point and a reactive power component command value, including the harmonic component of the grid, depending on load conditions, thereby realizing the supply of active power based on solar cell output and, simultaneously, compensating for reactive power generated in the load.

FIG. 4 indicates that the first inverter 120 of the present invention is responsible for part of active power required by the load through the MPPT control unit 210 of the MPPT-PQC integrated controller 130 using output based on solar light (the amount of solar radiation: 500 W/m2) and, at the same time, compensates for the reactive power of the load including a harmonic component through the PQC unit 220 of the MPPT-PQC integrated controller 130, with the result that it can be seen that the grid compensates for the shortage of active power required by the load. Accordingly, it can be seen that the system according to the present invention can acquire maximum power from the solar cells under all load conditions, including a nonlinear load condition, through MPPT, and, at the same time, has excellent power factor improvement and harmonic reduction performance.

Figure 5:
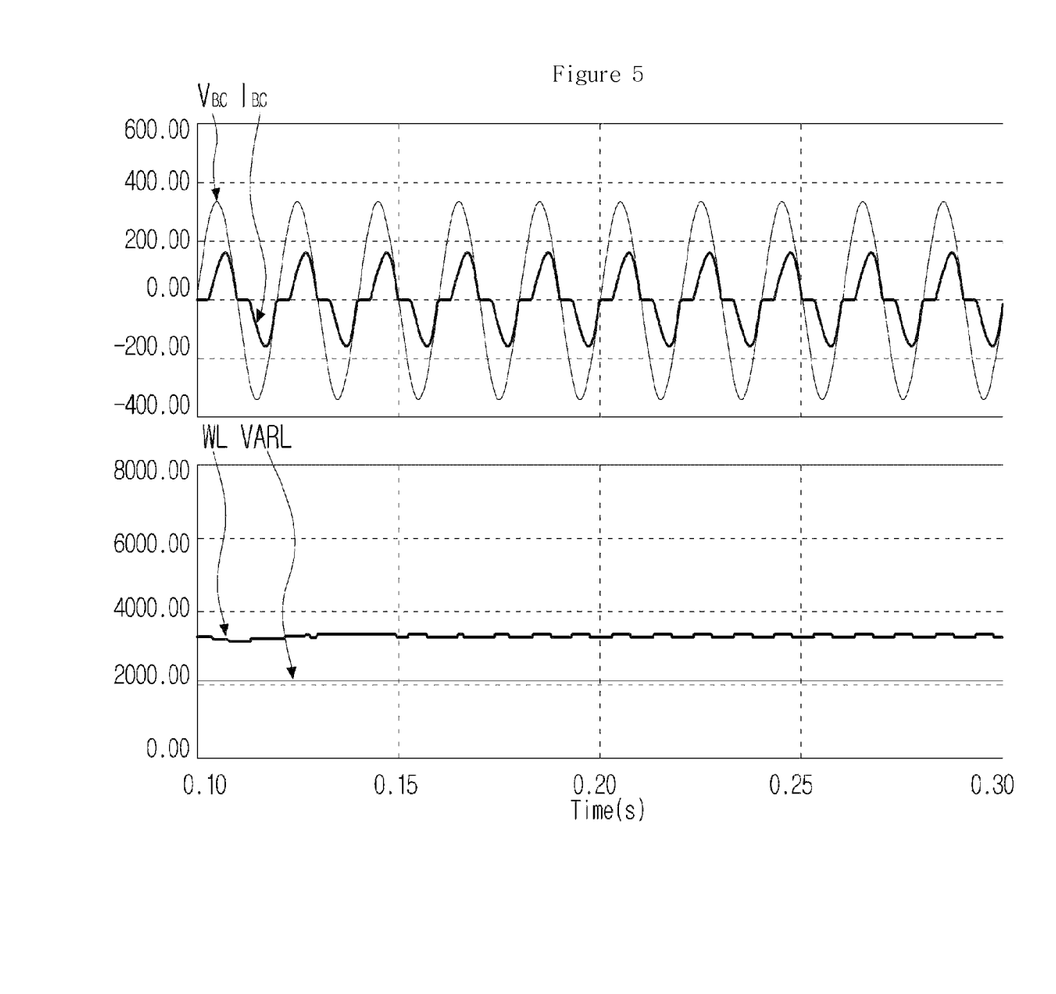
FIG. 5 shows the resultant waveforms of simulation when an input voltage of 240V, 50 Hz was applied to a nonlinear load in order to check an energy saving effect based on the illumination load voltage control of the grid-interactive photovoltaic generation system according to the present invention.

FIG. 5 shows the resultant waveforms of simulation when an input voltage of 240V, 50 Hz was applied to a nonlinear load having a capacity of 3967 VA (3349 W, 2126 Var, PF 0.84) in order to check an energy saving effect based on the illumination load voltage control of the grid-interactive photovoltaic generation system according to the present invention. FIG. 5 sequentially shows the waveforms of the load input voltage Vac and current Iac (magnified 5 times for ease of display), the waveform of the active power WL and the waveform of the reactive power VarL from the top thereof.

From FIG. 5, it can be seen that the waveform of the input current was significantly distorted under conditions, including a power consumption of 3349 W and 2126 Var and the presence of only a nonlinear load.

Figure 6:
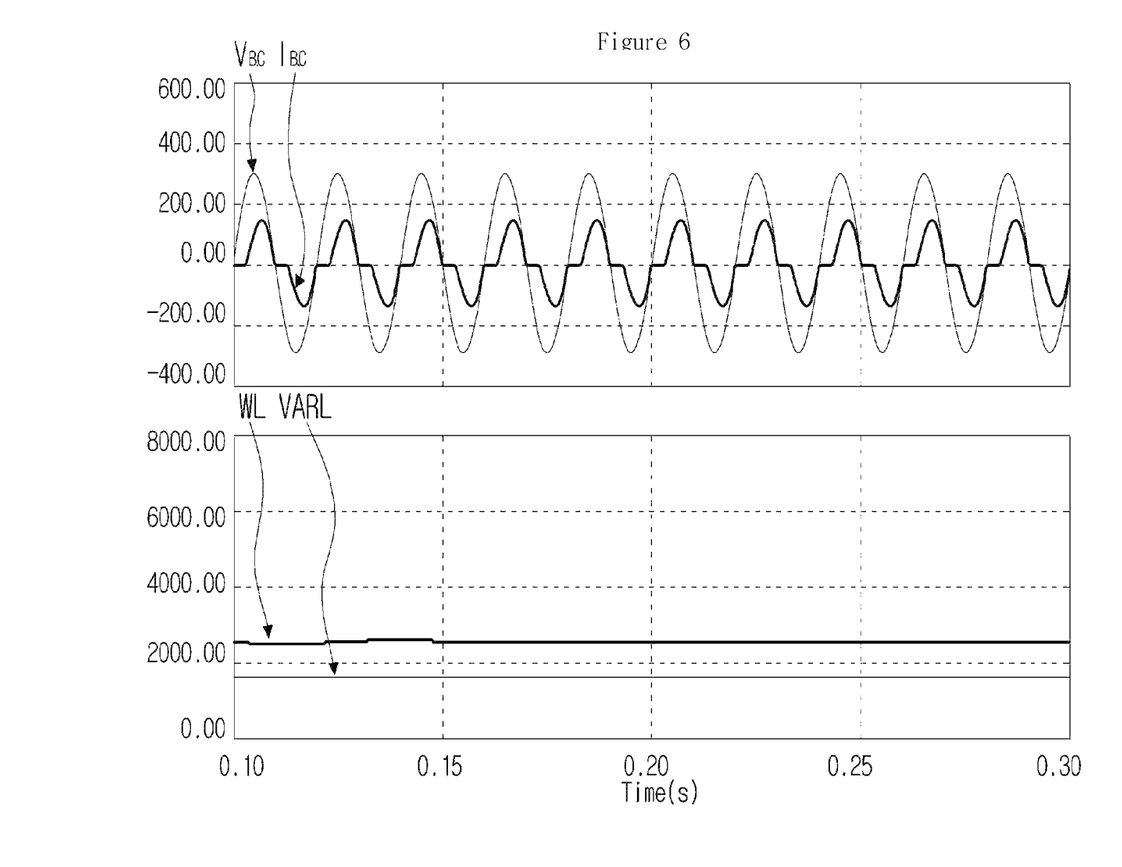
FIG. 6 shows the resultant waveforms of simulation when an input voltage of 210 V, 50 Hz was applied to a nonlinear load in order to check an energy saving effect based on the illumination load voltage control of the grid-interactive photovoltaic generation system according to the present invention.

FIG. 6 shows the resultant waveforms of simulation when an input voltage of 210 V, 50 Hz was applied under experimental conditions, such as those shown in FIG. 5, in order to check an energy saving effect based on the illumination load voltage of the grid-interactive photovoltaic generation system according to the present invention. FIG. 6 sequentially shows the waveforms of the load input voltage Vac and current Iac (magnified 5 times for ease of display), the waveform of the active power WL and the waveform of the reactive power VarL from the top thereof.

From FIG. 6, it can be seen that an energy saving effect of about 24% can be achieved due to a load voltage drop of 13% attributable to a power consumption of 3029 VA (2558 W, 1622 Var, PF 0.84), compared to the case shown in FIG. 5. Although the energy saving effect can be acquired form various loads as well as an illumination load, it is highest in the case of the illumination load, but is lowest in the case of a motor load. However, it can be seen that there is no difference in the distortion of the load current waveform attributable to the load power factor and the nonlinear load, compared to the case shown in FIG. 5. This indicates that the existing power saving device that performs only load voltage control provides an energy saving effect, but does not play any role in the improvement of a load power factor and a reduction in harmonics.

Figure 7:
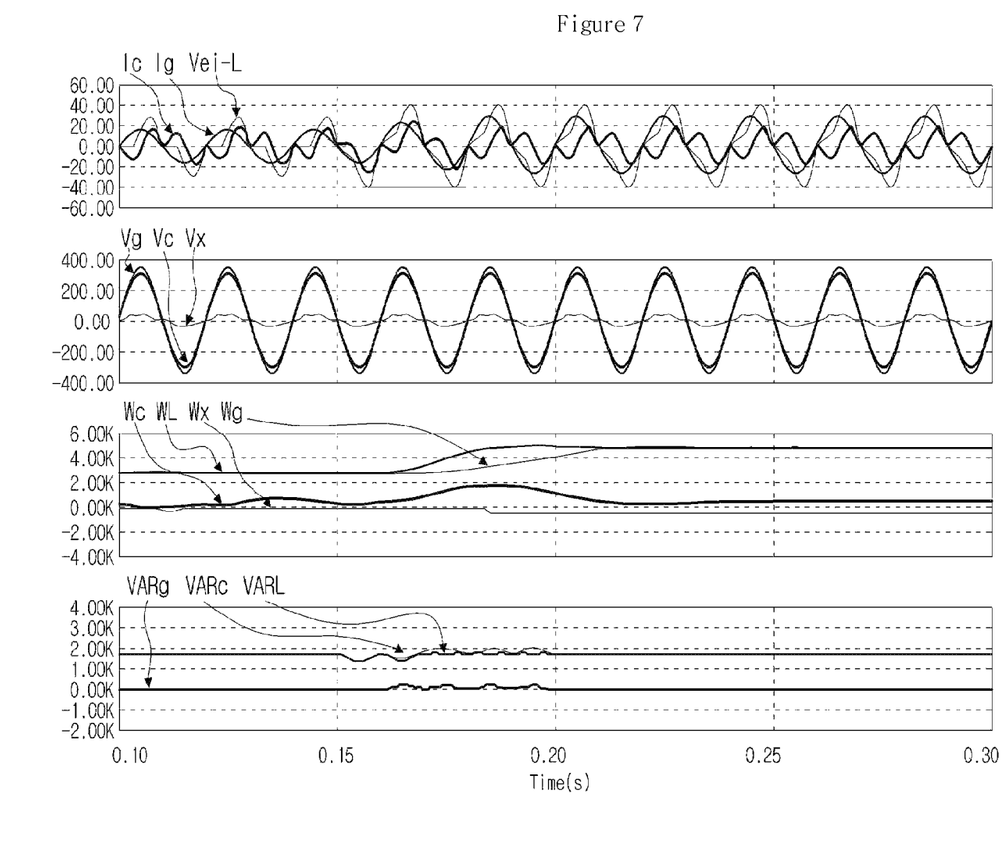
FIG. 7 shows the resultant waveforms of simulation when both the first inverter and the second inverter were operated at the same time through the MPPT-PQC integrated controller and the voltage controller.

FIG. 7 shows the resultant waveforms of simulation when both the first inverter 120 and the second inverter 160 were operated at the same time through the MPPT-PQC integrated controller 130 and the voltage controller 140 in order to check the effects of energy saving and power quality improvement based on the illumination load voltage control of the grid-interactive photovoltaic generation system according to the present invention.

Although all devices used in the simulation were assumed to be ideal, as in the cases shown in FIGS. 3 to 4, this simulation was performed using PSIM software, with switches used in the inverters being set under the condition of a turn-on resistance Rsw=36 mΩ. This drawing shows the resultant waveforms of simulation when a voltage of 240 V, 50 Hz (a rated voltage in EU and Australia) was applied, 210 V was set as a load voltage appropriate for energy saving, a linear load having a capacity of 3967 VA (3349 W, 2126 Var, PF 0.84) was applied, and the linear load was increased to a nonlinear load having a capacity of 6234 VA (5860 W, 2126 Var, PF 0.94) after 0.15 seconds, in order to check the utility and control characteristics of the present invention.

FIG. 7 sequentially shows the waveforms of current (power source current $I_g$, the load current IL, and first inverter current Ic), the waveforms of voltage power (source voltage Vg, load voltage VL, and second inverter voltage Vc), the waveforms of active power (power source Wg, load WL, first inverter Wc, and second inverter Wx), and the waveforms of reactive power (power source Varg, load VarL, and first inverter Varc).

From FIG. 7, it can be seen that the system of the present invention maintained the voltage at 210 V regardless of variation in load. Accordingly, energy consumed by the load was maintained at 2608 W, 1675 Var (power factor: 0.84) and was then adjusted to 4676 W, 1725 Var (power factor: 0.94) after 0.15 seconds. In response to this, the input current was adjusted to sinusoidal current by compensating for the distortion of the load current attributable to the nonlinear load using the first inverter while adjusting the power of the first inverter from 197 W, 1666 Var to 429 W, 1730 Var, the power of the second inverter from 260 W to 463 W, the grid input power from 2679 W (power factor: 1) to 4630 W (power factor: 1).

This indicates that, in conformity with the intension of the present invention, the control energy of second inverter for energy saving is recovered in conjunction with the first inverter and harmonics and reactive power are considerably improved by the first inverter, with the result that power quality is improved and an energy saving effect of about 26% is achieved. This is greater than the energy saving effects in the cases of FIGS. 3 to 6, in which there is no loss because only applied voltage is simply dropped. It can be seen that the system of the present invention has a synergy effect in which energy saving attributable to the improvement of reactive power is added to a voltage drop effect in spite of inverter loss. Furthermore, since the energy controlled through the second inverter to control voltage is merely 7.4% of load rating, it can be seen that it is possible to manufacture the grid-interactive photovoltaic generation system having power quality improvement and power saving functions according to the present invention without incurring additional costs, compared to the existing systems.

Meanwhile, in the case in which the grid-interactive photovoltaic generation system according to the present invention is applied to a three-phase grid, a three-phase unbalanced load and a grid power source must be taken into account. Accordingly, for the MPPT-PQC integrated controller 130 and voltage controller 140 of FIG. 1 not only to perform the above-described functions but also to solve the problems of the three-phase unbalanced load and the grid power source, the instantaneous power theory (p-q theory) must be used. However, since the instantaneous power theory is based on a three-phase matrix, it has drawbacks in that computation is complex, and power source current is distorted due to low-order harmonics after compensation when three phases are asymmetric.

Here, in the present invention, in order to solve the problems in the case in which the first inverter 120 and the second inverter 160 controlled by the MPPT-PQC integrated controller 130 and the voltage controller 140 are each constructed in a three-phase form, an embodiment capable of performing three-phase unbalanced control using simple computation, instead of the instantaneous power theory (p-q theory), will be described in detail with reference to FIGS. 8 and 9.

Figure 8:
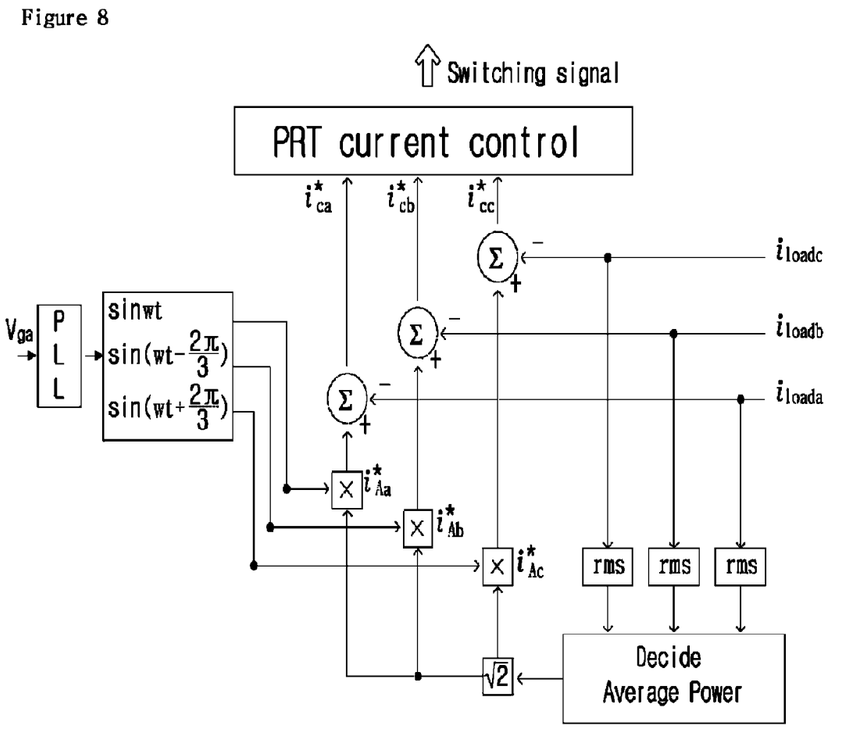
FIG. 8 is a controller block diagram illustrating the operational principle when the MPPT-PQC integrated controller 130 of FIG. 1 according to the present invention is operated in a three-phase fashion.

FIG. 8 is a controller block diagram illustrating the operational principle when the MPPT-PQC integrated controller 130 of FIG. 1 according to the present invention is operated in a three-phase fashion.

The basic operational principle is the same as that of the MPPT-PQC integrated controllers 130 of FIGS. 1 and 2. Accordingly, the active current command value $I^*_{cp(abc)}$ for supplying active power to the grid and the reactive current command value $I^*_{cq(abc)}$ capable of compensating for a reactive current component are required [here, abc included in ( ) of a subscript refers to the a, b and c phases of three phases].

The system according to the present invention can control $I^*_{cp(abc)}$ and $I^*_{cq(abc)}$ independently. For this purpose, it is possible to implement the MPPT-PQC integrated controller by simply changing the program of a processor rather than adding a new circuit to an existing grid-interactive solar light system. In this case, when the three-phase load is unbalanced, the load average power of each phase is obtained to perform the balance control of the grid current, this is set to the grid current value $I^*_g$ suitable for the demand of the load using Equation 2 in a nighttime mode or Equation 2 in a daytime mode, the command current $I^*_{c(abc)}$ of each phase of the first inverter 120 is determined using Equation 4, and then the first inverter 120 is controlled using the PRT current controller. Here, the PRT current controller uses a Pulse Width Modulation (PWM) technique for controlling the inverter in a current controlled fashion. Since this method is well-known technology and is not the gist of the present invention, a detailed description thereof is omitted here.

Figure 9:
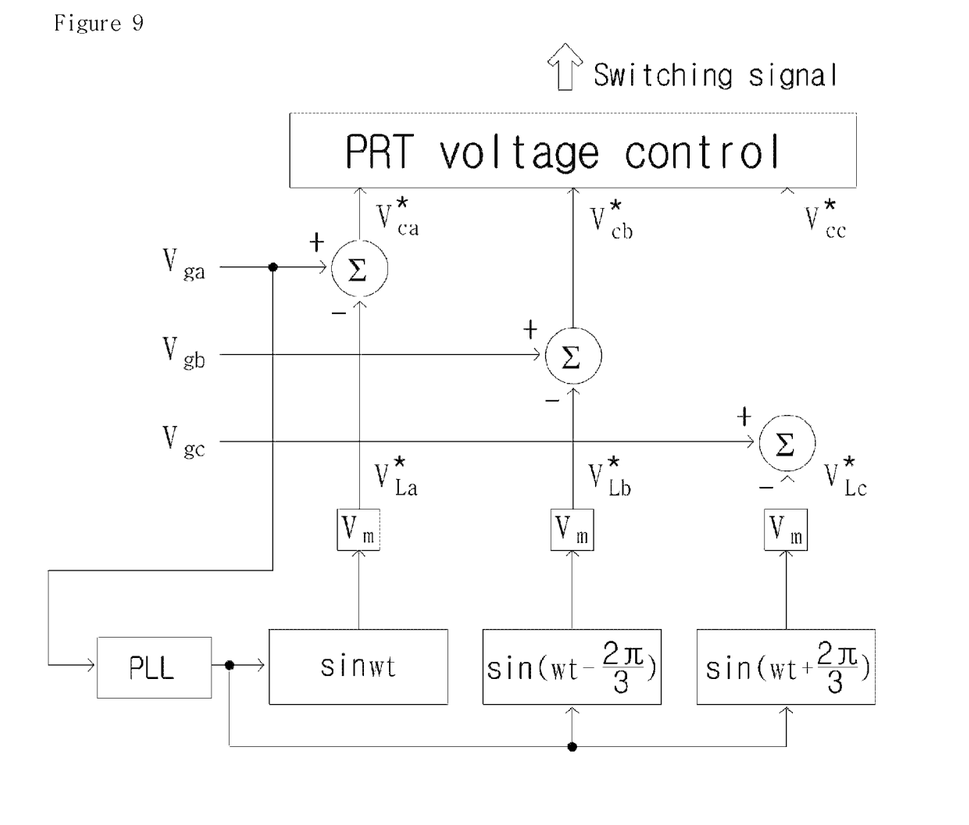
FIG. 9 is a controller block diagram illustrating the operational principle when the voltage controller of FIG. 1 according to the present invention is operated in a three-phase fashion.

FIG. 9 is a controller block diagram illustrating the operational principle when the voltage controller 140 of FIG. 1 according to the present invention is operated in a three-phase fashion.

The basic operational principle is the same as that of the voltage controller 140 of FIG. 1. Accordingly, the voltage controller 140 calculates the voltage command value $V^*_{x(abc)}$ of the second inverter 160 in order to set an optimum illumination voltage $V_{L(abc)}$ [the actual VLs are the same regardless of phase] capable of maximizing power consumption while maintaining an appropriate illuminance and maintain the illuminance at a uniform level and supply the uniform illuminance regardless of the level of the input grid voltage $V_{g(abc)}$. The second inverter 120 is controlled by the PRT voltage controller, as shown in FIG. 9, based on $V^*_{x(abc)}$ calculated using Equation 5. Here, the PRT voltage controller uses a Pulse Width Modulation (PWM) technique for controlling the inverter in a voltage controlled fashion. Since this method is a well-know technology and is not the gist of the present invention, a detailed description thereof is omitted here.

Figure 10:
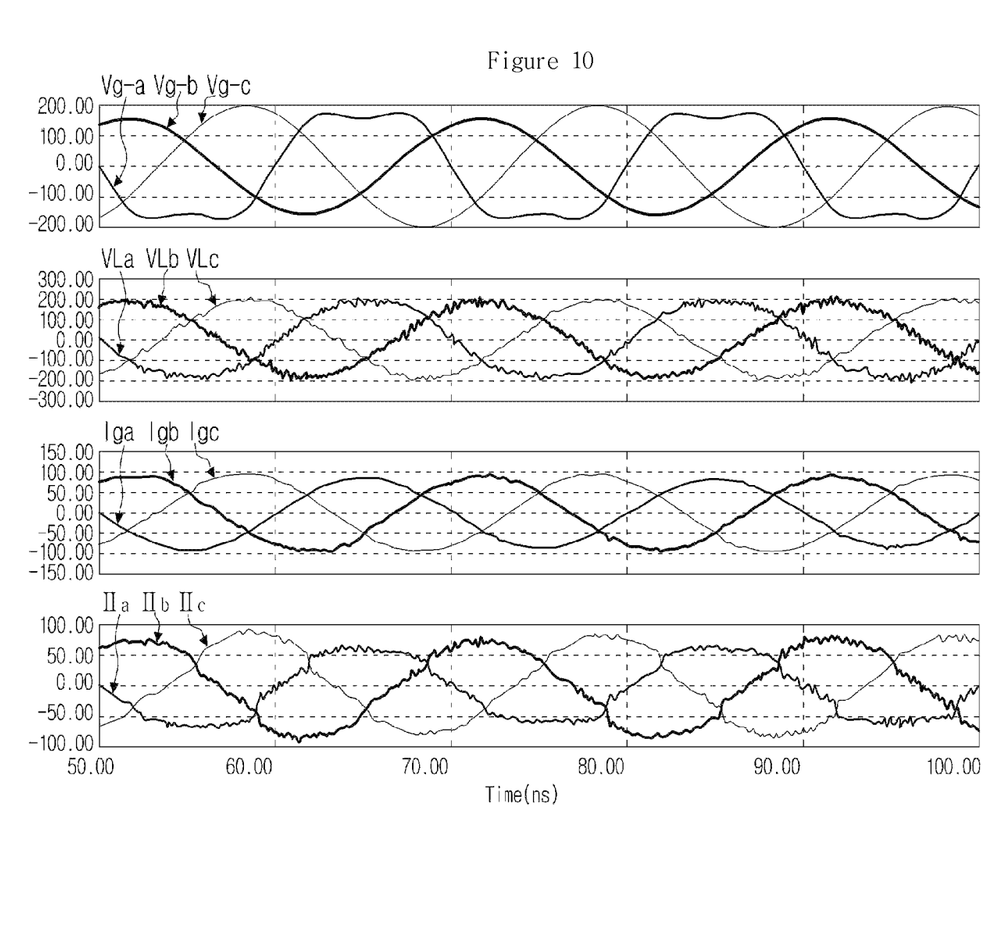
FIG. 10 shows the resultant waveforms of simulation when the grid-interactive photovoltaic generation system according to the present invention is applied to a three-phase grid.

In order to check whether the grid-interactive photovoltaic generation system is operated in conformity with the intention of the present invention in the case in which the grid-interactive photovoltaic generation system according to the present invention is applied to a three-phase grid, the results of PSIM simulation are shown in FIG. 10.

FIG. 10 shows the resultant waveforms of the simulation of the operation of the system in the case in which three-phase grid input voltages are unbalanced, even one-phase voltage is nonlinear voltage and a nonlinear unbalanced load is applied as a load when the grid-interactive photovoltaic generation system according to the present invention is applied to a three-phase grid. The simulation was performed using PSIM software on the assumption that all devices used in the simulation are ideal.

FIG. 10 sequentially shows the waveforms of three-phase input grid voltages $V_{g-a}$, $V_{g-b}$ and $V_{g-c}$, the waveforms of three-phase load voltages $V_{L-a}$, $V_{L-b}$ and $V_{L-c}$, the waveforms of three-phase grid currents $I_{g-a}$, $I_{g-b}$ and $I_{g-c}$, and the waveforms of three-phase load currents $I_{L-a}$, $I_{L-b}$ and $I_{L-c}$ from the top thereof. This indicates that, when the grid-interactive photovoltaic generation system according to the present invention is applied to a three-phase grid, three-phase grid current can be balanced, the improvement of power quality, such as the improvement of a power factor and a reduction in harmonics, can be realized, and three-phase load voltage is also balanced together with the improvement of power quality in conformity with the intention of the present invention, even in the strict conditions in which three-phase grid input voltages are unbalanced, even one phase voltage is nonlinear voltage, and a load is a nonlinear unbalanced load. Accordingly, it can be seen that the devised system has a power saving function, acquires the maximum power from solar cells through MPPT control, like a single-phase case, even under the condition of every three-phase load, including a nonlinear load, or three-phase voltage, and provides the improvement of power factor, a reduction in harmonics and excellent three-phase balance control performance.

INDUSTRIAL APPLICABILITY

The grid-interactive photovoltaic generation system according to the present invention has advantages in that it is capable of producing maximum power in photovoltaic generation, improving the quality of grid power, such as the improvement of a power factor and a reduction in harmonics, and reducing the power consumption of an illumination load in conjunction with an illumination system.

The invention claimed is:

1. A grid-interactive photovoltaic generation system having power quality improvement and power saving functions, the system comprising:
   a solar cell array for receiving solar light and generating predetermined power;
   a first inverter for converting the power, generated by the solar cell array, into power required by a grid line;
   a second inverter connected to the first inverter, and configured to step down power, which will be supplied to a load, to a predetermined voltage;
   a Maximum Power Point Tracking (MPPT)-Power Quality Control (PQC) integrated controller for performing control: in a nighttime mode of performing PQC in order to output high-quality power to the grid by controlling operation of the first inverter during a nighttime during which there is no solar light; and in a daytime mode of simultaneously performing both PQC in order to output improved quality power to the grid by controlling operation of the first inverter and MPPT in order to maximize power generated in a solar cell array by controlling operation of the first inverter during a daytime during which there is solar light; and
   a voltage controller for controlling operation of the second inverter so that a voltage, which will be supplied to the load, is stepped down to the predetermined voltage regardless of a presence of the solar light in order to save illumination power,
   wherein the second inverter is a Voltage Controlled Voltage Source Inverter (VCVSI) that is connected in series between a power source and the load,
   wherein saving of illumination power is realized by controlling the voltage applied to the load by operating the second inverter as the voltage controlled voltage source inverter (VCVSI) capable of directly controlling output voltage, thereby adjusting the output of the second inverter to equivalent AC voltage, and
   wherein the voltage of the load is adjusted to the predetermined voltage for the saving of illumination power by controlling a voltage Vx of a second transformer connected in series between the grid and the load, and a voltage command value V*x of the second inverter is calculated by a voltage controller in order to set an optimum illumination voltage $V_L$ capable of maximizing power saving while maintaining predetermined luminance and maintain and supply the voltage at a uniform level regardless of a level of a grid voltage $V_g$, and the relationship therebetween is expressed as follows:

$$V^*x = V_g - V_L,$$

wherein an output voltage of the second inverter controlled based on the equation is output as the control voltage Vx through the second transformer connected to the second inverter and the load voltage $V_L$ predetermined for energy saving is maintained by controlling the control voltage Vx regardless of the level of the applied grid voltage.

2. The grid-interactive photovoltaic generation system as set forth in claim 1, wherein the first inverter is a Current Controlled Voltage Source Inverter (CCVSI) that is connected in parallel to a grid input power source.

3. The grid-interactive photovoltaic generation system as set forth in claim 1, wherein the first inverter and the second inverter are connected in parallel to a power source comprising the solar cell array.

4. The grid-interactive photovoltaic generation system as set forth in claim 1, wherein, in the nighttime mode of performing PQC, an improvement of power quality including an improvement of a power factor and a reduction in harmonics is performed using a predetermined equation.

5. The grid-interactive photovoltaic generation system as set forth in claim 1, wherein, in the daytime mode, both a MPPT control unit and a PQC unit simultaneously operate because maximum power point tracking (MPPT) control based on the solar light must be considered, with a result that both the MPPT of photovoltaic generation and the improvement of the power quality of the grid are performed using a predetermined equation.

* * * * *